United States Patent [19]

Wilson et al.

[11] 4,446,740

[45] May 8, 1984

[54] FREQUENCY CONTROLLED HYBRID ULTRASONIC IMAGING ARRAYS

[75] Inventors: David A. Wilson; James L. Buxton, both of Palo Alto; Philip S. Green, Atherton, all of Calif.

[73] Assignee: SRI International, Menlo Park, Calif.

[21] Appl. No.: 356,467

[22] Filed: Mar. 9, 1982

[51] Int. Cl.³ .......................................... G01N 29/00
[52] U.S. Cl. ...................................... 73/626; 73/599; 73/625; 128/660
[58] Field of Search ...................... 73/599, 625, 626; 128/660

[56] References Cited

U.S. PATENT DOCUMENTS

| | | | |
|---|---|---|---|
| 3,815,409 | 6/1974 | Macovski | 73/625 |
| 4,016,750 | 4/1977 | Green | 73/629 |
| 4,290,310 | 9/1981 | Anderson | 73/626 |
| 4,307,613 | 12/1981 | Fox | 73/626 |
| 4,319,489 | 3/1982 | Yamaguchi et al. | 73/626 |
| 4,368,643 | 1/1983 | Tachita et al. | 73/626 |
| 4,372,323 | 2/1983 | Takemura et al. | 73/625 |

OTHER PUBLICATIONS

"Computer Controlled Acoustic Beam Steering and Focusing with Variable Frequency Array Transducers", Reid et al, IBM Technical Disclosure Bulletin, vol. 22, No. 4, pp. 1696–1697, Sep. 1979.

Primary Examiner—Howard A. Birmiel
Attorney, Agent, or Firm—Edward B. Gregg; Willis E. Higgins; Urban H. Faubion

[57] ABSTRACT

This ultrasonic imaging apparatus has an array (44, 52 or 100) of transducer elements (44, 50 or 104) for transmitting ultrasonic signals having a first predetermined center frequency (fc1) into an object (12) to be analyzed through use of the transmitted signals reflected from within the object. A means (150, 116-1 through 116-X and 120-1 through 120-X) is connected to transmit the ultrasonic signals from the array (44, 52 or 104) in a stepped array mode. A means (150, 116-1 through 116-X and 120-1 through 120-X) is connected to transmit the ultrasonic signals from the array (44, 52 or 104) in an angle scanning mode. There is a means (150, 128-1 through 128-X) for focusing the transmitted signals at a desired depth within the object (12). The reflected signals sensed by the apparatus have a second center frequency (fc2) less than the first center frequency (fc1) as a result of signal attenuation by the object (12). There is a means connected to select between the stepped array transmission mode and the angle scanning transmission mode for operating the array elements based on the second center frequency (fc2). Varying the operating mode of the apparatus on this basis gives improved image resolution over a wider operating range than with prior art systems.

46 Claims, 6 Drawing Figures

FREQUENCY CONTROLLED HYBRID ULTRASONIC IMAGING ARRAYS

CROSS REFERENCE TO RELATED APPLICATION

This application and a concurrently filed application, entitled "FREQUENCY VARIED ULTRASONIC IMAGING ARRAY" by David A. Wilson and James L. Buxton, are directed to related inventions.

FIELD OF THE INVENTION

This application is directed to improvements in ultrasonic imaging apparatus to produce a better image quality. More particularly, the invention relates to improved modes of operation for ultrasonic transducers utilized in such imaging apparatus.

DESCRIPTION OF THE PRIOR ART

The use of ultrasonic sound waves in apparatus for the analysis of solid objects is now a well-known and comparatively well developed art. In such apparatus, an array of ultrasonic transducer elements is used to transmit ultrasonic waves into an object, and echoes of the waves are used to define geometry and related characteristics of the object's interior. Such ultrasonic imaging apparatus has been found to be particularly useful in medical applications as a non-invasive diagnostic tool. The state of the art in such medical applications has been reviewed, for example, by Havlice and Taenzer, "Medical Ultrasonic Imaging", Proceedings of the IEEE, Volume 67, No. 4, April 1979, pages 620 to 641.

As pointed out in the Havlice and Taenzer article, presently available electronically scanned medical ultrasonic imaging apparatus is of two principal types: linear stepped array and (linear) phased array. In the linear stepped array apparatus, each ultrasonic transducer element group in the array has a fixed beam direction, directly in front of the group. Successive groups of transducer elements are activated to define a rectilinear field of vision. In the (linear) phased array, all of the ultrasonic transducer elements in the array are activated simultaneously, but different length-of-delay lines are used to direct the ultrasonic waves in a sector scan and sometimes to focus the ultrasonic waves to a particular depth in the sector field of vision.

It is well recognized that attenuation of higher frequency ultrasonic signals occurs as the signals penetrate more deeply into tissue. This causes a net frequency shift downward away from the average transmission frequency and therefore results in image degradation.

It is also known to provide ultrasonic arrays that can be operated in more than one mode to provide a more complete image, as disclosed by Carpenter et al, "Multiple Mode Scanning Linear Array", Abstract, 4th World Congress on Ultrasonics in Medicine, 1979, page 2, and Ohmori et al, "A Multi-purpose Real Time Ultrasonic Imaging System with Dynamic Architecture", page 380 of the same publication, but those systems, as disclosed, do not change their operation based on frequency shifts due to signal attenuation.

SUMMARY OF THE INVENTION

Accordingly, it is an object of this invention to provide an ultrasonic imaging apparatus in which operating mode of the apparatus is changed for lower frequencies resulting from attenuation by an object being analyzed of ultrasonic signals as sensed by the apparatus.

It is still another object of the invention to provide a hybrid ultrasonic imaging apparatus which utilizes array stepping for near field imaging and sector scanning for deep field imaging.

It is another object of the invention to provide a hybrid ultrasonic imaging apparatus in which a portion of an image obtained with the apparatus is generated in an array stepping mode and the remainder of the image is generated by an angle scanning mode.

The attainment of these and related objects may be achieved through use of the novel ultrasonic imaging apparatus herein disclosed. Apparatus in accordance with this invention includes an array of transducer elements for transmitting ultrasonic signals having a first predetermined center frequency into an object to be analyzed through use of the transmitted signals reflected from the object. Within the object, the ultrasonic signals are reduced to a second center frequency, which is lower than the first center frequency as a result of round-trip attenuation by the object, as sensed by the apparatus after reflection by interfaces or discontinuities at a given depth. There will be a different second center frequency for echoes from each depth in the object. The apparatus has a means connected to transmit and receive the ultrasonic signals from and to the array in a stepped array mode. The apparatus also has a means connected to transmit and receive the ultrasonic signals from and to the array in an angle scanning mode. A means is connected to select between the stepped array transmitting and receiving means and the angle scanning transmitting and receiving means, based on the second center frequency at the depth of focus of the signals. Based on the degree of attenuation of the transmitted center frequency by the object, the selection means will choose the angle scanning array transmitting and receiving means when the apparatus is focused on a deeper field within the object, where a greater degree of attenuation takes place. As used herein, the term "angle scanning" means that the beam is directed at an angle using all or part of an array. Sector scanning is a special case of angle scanning in which all of the array is used for transmitting or receiving.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
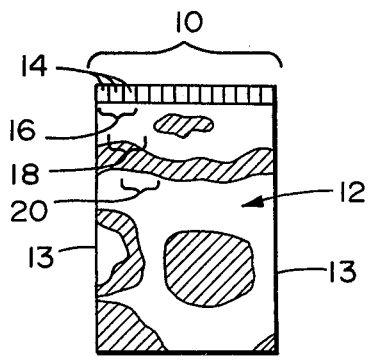
FIG. 1 is a side view of a conventional linear stepped array, which may be utilized with the invention.

Turning now to the drawings, more particularly to FIG. 1, there is shown a linear stepped array 10, which may be utilized with the invention. The array 10 is positioned to image a portion 12 of a person's body. The portion 12 is rectilinear in shape because successive groups of transducer elements 14 in the array 10, a portion of the groups being respectively indicated by brackets 16, 18 and 20, are activated and stepped from left to right in the array 10 as shown to define a rectilinear field of vision 13 of the array 10.

It should be noted that each group 16, 18 and 20 of transducer elements 14 indicated in FIG. 1 is shown to contain three of the transducer elements 14. As will be explained in more detail below, the number of elements 14 in each group 16, 18 and 20 may be changed, depending on the center frequency of ultrasonic signals sensed at the transducer elements 14, due to attenuation by the body under investigation. In all cases the center frequency of the sensed ultrasonic signals will be less than the frequency of the ultrasonic signals as transmitted by the elements 14, due to the attenuation. The difference between the center frequency of the ultrasonic signals as sensed and the center frequency of the transmitted ultrasonic signals will depend on their depth of penetration into body 12 before reflection. Thus, as the transmitted ultrasonic signals are focused deeper into the body 12, a substantial decrease in the center frequency of the sensed ultrasonic signals occurs.

Figure 2:
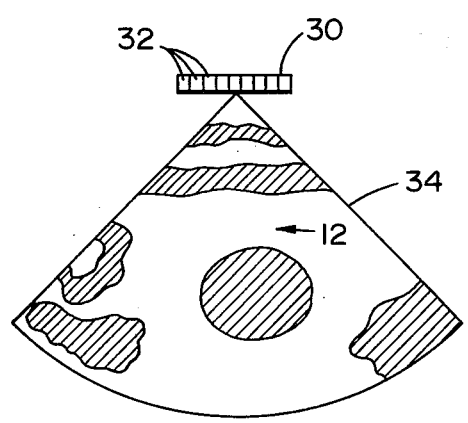
FIG. 2 is a similar side view of a conventional sector scanned array, useful for complete understanding of the invention.

FIG. 2 shows a sector scanned array 30 of ultrasonic transducers 32 of a known type. Through use of different electronically induced delays in the transmitted and received signals from and to transducers 22, the focal axis of signals is shifted to cause a scanning pattern from the array 30, producing a sector shaped field of view 34 of the body 12. As in the case of the FIG. 1 embodiment, there is a substantial decrease in the center frequency of the signals transmitted by the transducers 32 at the depth of focus of the signals, due to attenuation within the body 12.

Figure 3:
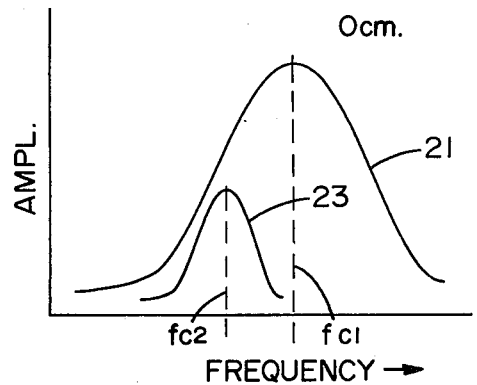
FIG. 3 is a graph of frequency spectra useful for understanding the invention.

FIG. 3 shows an idealized representation of typical transmitted and received ultrasonic spectra 21 and 23 which may be obtained with transducer array 10. Since a proportionally greater attenuation of the transmitted spectrum 21 (0 cm into body 12) occurs at higher frequencies, its center frequency $f_{c1}$ is greater than the center frequency $f_{c2}$ of spectrum 23, which is reflected from 4 cm within body 12.

There are certain mathematical relationships defining the nature of the attenuation useful for a more complete understanding of the present invention. For mathematical simplicity transducers 14 in FIG. 1 may be assumed to produce ultrasonic signals with a Gaussian frequency response as received after the reflection back at the transducers, which may be described by the following equation:

$$V(f) = A e^{-\alpha(f-f_0)^2} \qquad \text{Equation (1)}$$

Where
A = constant
V(f) = round-trip voltage response
$f_0$ = center frequency of received signal
$\alpha = (\ln 4)/(\Delta f)^2$
$\Delta f = -3$ dB full bandwidth Equation 1 may be expressed in terms of a fractional bandwidth, B, which is equal to $(\Delta f/f_0)$, as follows:

$$V(f) = A e^{\left[ \frac{-(\ln 4)(f-f_0)^2}{(B f_0)^2} \right]} \qquad \text{Equation (2)}$$

Attenuation of the signals produced by transmission through body tissue 12 can be approximated by a loss term proportional to frequency in the following manner:

Loss (dB) = $K \cdot f(\text{MHz}) \cdot 2 \cdot \text{depth (cm)}$ where K varies from 0.6 dB/cm/MHz to 1.2 dB/cm/MHz in typical soft tissue.

This amplitude loss can be written exponentially as shown in the following equation:

$$A(f,d) = e^{-0.23 \times K(dB/cm/MHz) \times f(MHz) \times depth (cm)} \qquad \text{Equation (3)}$$

One of the advantages of the present invention is that no electrical filtering of the transmitted or received signals is required. Assuming no such filtering is done, equations 2 and 3 can be combined to get the round trip signal as a function of frequency and depth into the tissue. To find the sensed center frequency at each depth of focus, the resulting expression must be differentiated, e.g., $$\frac{d}{df}[V(f,d)] = o. \text{ This yields } f_{center} = \qquad \text{Equation (4)}$$

$$f_0 - 0.083 \times K(dB/cm/MHz) \times \text{depth (cm)} \times B^2 \times f_0^2$$

In equation (4), $f_{center}$ is never less than 0.

A basic distinction between the transducer elements 14 in the linear stepped array of FIG. 1 and the transducer elements 32 of the sector scan array 30 of FIG. 2 is the relationship between transducer element width and wavelength of the ultrasonic signals transmitted by the transducers in each case. For the linear array 10 of FIG. 1, the elements 14 are relatively wide. They typically have a width of about three times the wavelength of the transmitted signals. This is possible because the transducer elements 14 always have their focal axis normal to the plane of the elements, so that the severe grating lobes which would exist with such wide elements if the beam were steered are not a problem. In the case of the sector scanned array 30, the transducer elements 32 must be narrow with respect to the transmitted wavelengths. Typically, the elements 32 have a width half the wavelength of the transmitted ultrasonic signals, so that no grating lobes are present in the response curves of the transducers 32.

Due to design and operation based on the decrease of center frequency of the transmitted signals in the body 12 analyzed with the system of this invention, improved image definition with the linear stepped array 10 of FIG. 1 can be obtained, and a hybrid approach can be utilized, in which a transducer array is operated in the linear stepped array mode for near field observations, and in the sector scanning mode for deep field observations. The latter approach becomes possible because the lowered frequency for echoes from targets deep in the object makes the wavelength longer, and therefore the element spacing becomes smaller relative to the wavelength of the attenuated echo signal. When the signal from linear array transducer elements 14 has been attenuated sufficiently so that the element spacing is on the order of one wavelength or less, the signal beam can be scanned in the manner of a sector scan array, as shown in FIG. 2. The ability to scan, and the scan angle, are limited by the presence of grating lobes, which exist for transducer elements greater than half the wavelength of the sensed signal. For elements smaller than this, a scan angle of 90 degrees may be employed.

For an array focused at angle $\theta_F$, a grating lobe exists at angle $$\theta_{gl} = \sin^{-1}\left[\sin \theta_F - \frac{\lambda}{a}\right] \quad \text{Equation (5)}$$

where $a$ is the center-to-center spacing of the elements, and $\theta_F > 0$. This equation is exact for the cw case, and approximate for the pulsed case. To prevent grating lobes from occurring, the scan angle is restricted to $$|\theta_F| < \sin^{-1}\left(\frac{\lambda}{a} - 1\right) \quad \text{Equation (6)}$$

For example, at 5 MHz frequency, the wavelength in water is 0.3 mm. For an array with elements spaced 0.2 mm apart, no grating lobes exist for scan angles up to +30°, but will exist if the beam is steered to larger angles.

To determine the maximum scan angle as a function of depth, one must know the center frequency as a function of depth. This is controlled by a number of parameters, including:
1. transducer response versus frequency (bandwidth, center frequency and bandshape)
2. tissue attenuation versus frequency (may be a function of depth)
3. frequency response of the receiving electronics (may be time-variable, and hence a function of depth).

Equation 6 can be combined with Equation 4 to give the maximum angle to which the array can be scanned as follows:

$$|\theta_F| \leq \sin^{-1}\left(\frac{V}{f_{center} \times a} - 1\right) \quad \text{Equation (7)}$$

where V = acoustic velocity.

Equation 7 has the following special cases:
(1) When $f_{center}$ is very high: $f_{center} \geq (V/a)$. In this case $\theta_F = 0$, i.e., the array must be used in the "stepped array" mode.
(2) When $f_{center}$ is very low: $f_{center} \leq (V/2a)$. In this case $\theta_F$ is allowed to be as much as 90°, i.e., the array can be used as a full sector scanner.
(3) When $(V/2a) = f_{center} = (v)/a$, the array can be scanned over some limited angle.

Figure 5:
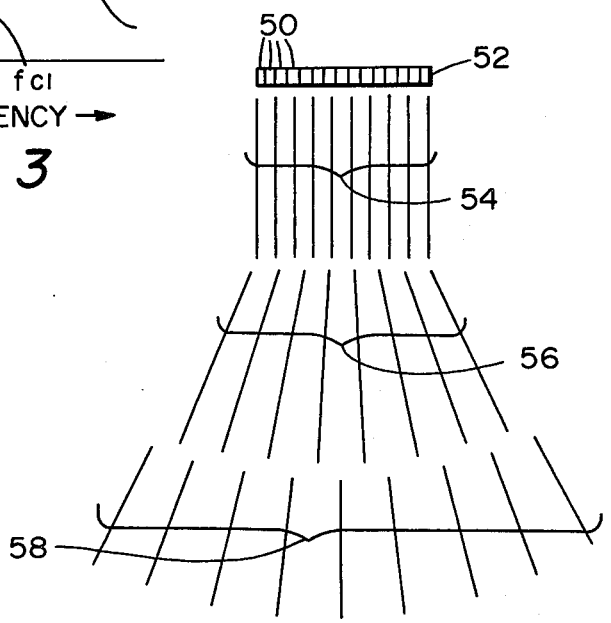
FIG. 5 is another side view, but of a different form of a hybrid array for use with the invention.
Figure 4:
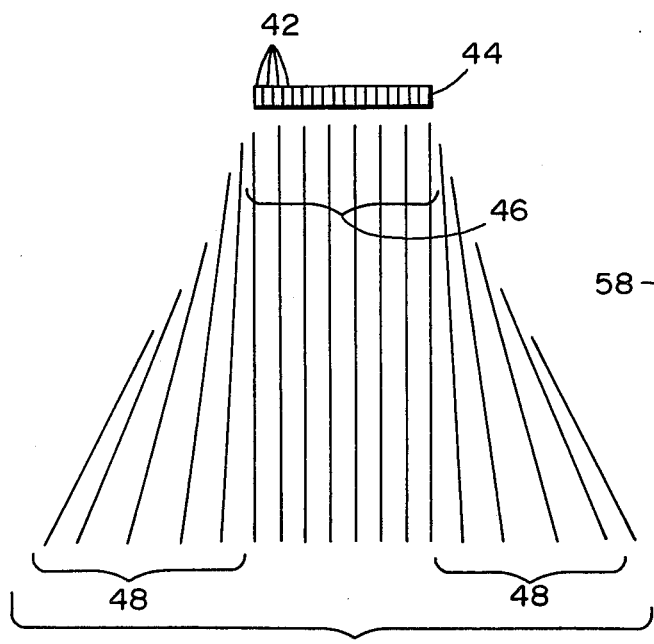
FIG. 4 is a similar side view of a hybrid array, for use in an embodiment of the invention.

FIGS. 4 and 5 show two different embodiments of hybrid transducer arrays in accordance with the invention. Lines 40 in FIG. 4 define focal axes for transducer elements 42 in the array 44. Centrally disposed lines 46 are perpendicular to the plane of the array 44 because the focal axes of the transducers 42 corresponding to these lines remain fixed at right angles to the plane of array 44. Remaining lines 48 to the left and right of lines 46 represent focal axes for elements 42 at the left and right edges of array 44 that are operated in an angle scanning mode to broaden the overall field of view represented by lines 40. In each case, the lines 48 represent the maximum extent of scanning for each of their associated elements 42. The lines 48 begin at successively greater distances from the array 44 because the angled scan lines are activated only as the focus of array 44 is extended deeper into the field.

In the embodiment of FIG. 5, elements 50 of the array 52 are operated in the stepped array mode when the array 52 is focused in the near field, as represented by lines 54. With focus into the deep field, elements 50 of the array 52 are then operated in the sector scan mode when attenuation of the transmitted ultrasonic waves is substantial enough to allow a substantial scanning angle, as represented by lines 56. As the selected observation depth increases, the scanning angle can be increased, as represented by lines 58.

Figure 6:
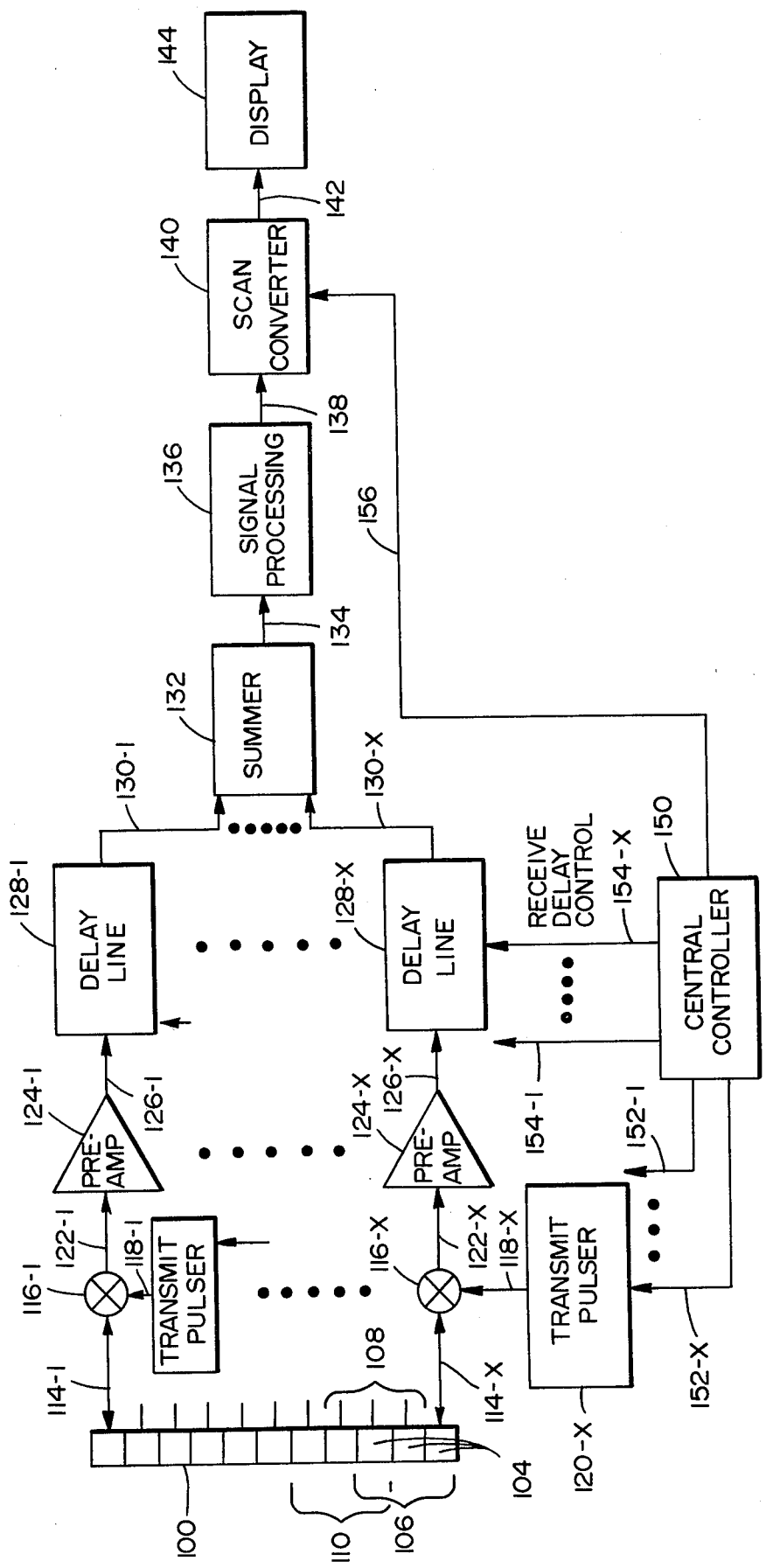
FIG. 6 is a block diagram of imaging apparatus in accordance with the invention.

FIG. 6 shows one embodiment of the electronics necessary for implementing an ultrasonic imaging system incorporating the present invention. Array 100 includes transducer elements 104 arranged in overlapping groups 106, 108 and 110 as in FIG. 1. Each of the elements 104 of array 100 is connected by a line 114-1 to 114-x to a transmit and receive switch 116-1 through 116-X. Each transmit and receive switch 116-1 through 116-X is connected by a line 118-1 through 118-X to transmit pulser circuits 120-1 through 120-X. The transmit and receive switches 116-1 through 116-X are also connected by lines 122-1 through 122-X to preamplifiers 124-1 through 124-X. The preamplifiers 124-1 through 124-X are in turn connected by lines 126-1 through 126-X to digital delay lines 128-1 through 128-X. Digital delay lines 128-1 through 128-X are connected by lines 130-1 through 130-X to summing circuits 132. Summing circuits 132 are connected by line 134 to signal processing circuits 136. Signal processing circuits 136 are connected by line 138 to scan converter circuits 140, which are in turn connected by line 142 to a video display 144.

Central controller 150 is connected by lines 152-1 through 152-X to each of the transmit pulser circuits 120-1 through 120-X. Central controller 150 is connected to each digital delay line 128-1 through 128-X by control lines 154-1 through 154-X. Control signal lines 152-1 through 152-X supply transmit-delay control signals to the transmit pulser circuits 120-1 through 120-X. The control lines 154-1 through 154-X transmit receive delay control signals to delay lines 128-1 through 128-X. Central controller 150 is also connected by control line 156 to scan converter 140. If controller 150 is implemented as a microprocessor, a suitable control program for implementing the control functions described herein is provided in a read only memory (ROM).

The apparatus shown in FIG. 6 has the transmit pulser circuits 120-1 through 120-X, preamplifiers 124-1 through 124-X and delay lines 128-1 through 128-X implemented in fully parallel form. This construction allows the system of FIG. 6 to be operated in accordance with the present invention, with the above referenced Wilson et al "Frequency Varied Ultrasonic Imaging Array" related invention, the disclosure of which is incorporated herein by reference, or utilizing both inventions. In accordance with the present invention, the transducers 104 are operated in a stepped array mode for imaging in the near field and in an angle scan mode as shown in FIGS. 4 and 5 for imaging in the deep field.

Selection of operating mode and scan angles when operating with a sector scan mode is made on the basis of sensed or calculated signal attenuation.

In operation of a system as shown in FIGS. 1 and 4 to 6, assuming a transmitted frequency of 10 MHz, the ultrasonic signal would be attenuated as shown below in Table I, based on the mathematical relationships discussed above.

TABLE I

| Bandwidth (%) | Attenuation factor (dB/cm/MHz) | $f_{center}$ at 2 cm (MHz) | $f_{center}$ at 4 cm (MHz) |
|---|---|---|---|
| 40 | 0.8 | 7.9 | 5.8 |
| 40 | 1.0 | 7.3 | 4.7 |
| 40 | 1.2 | 6.8 | 3.6 |
| 50 | 0.8 | 6.7 | 3.4 |
| 50 | 1.0 | 5.9 | 1.7 |
| 50 | 1.2 | 5.0 | 0.04 |

In operation of a system as shown in FIG. 6, Table II below shows the sector scanning angles that may be achieved at various center-to-center spacings for the elements 104 of array 100 when scanning tissues with an attenuation of 1 dB/cm/MHz, a transmitted center frequency of 10 MHz, a bandwidth of 50%, and focusing depths into the tissue as indicated. Where a maximum scanning angle of zero is indicated, the array must be operated in the stepped mode, with increases in the maximum scan angle to 90° as depth imaging increases.

TABLE II

| Depth (cm) | Freq., MHz | Max. Scan Angle, Degrees |
|---|---|---|
| Center-to-Center Spacing = 1.15 mm | | |
| 0 | 10 | 0 |
| .5 | 8.9625 | 6.64747 |
| 1 | 7.925 | 15.1727 |
| 1.5 | 6.8875 | 26.866 |
| 2 | 5.85 | 45.1863 |
| 2.5 | 4.8125 | 89.9209 |
| 3 | 2.775 | 89.9209 |
| 3.5 | 3.775 | 89.9209 |
| 4 | 1.7 | 89.9209 |
| Center-to-Center Spacing = .2 mm | | |
| 0 | 10 | 0 |
| .5 | 8.9695 | 0 |
| 1 | 7.925 | 0 |
| 1.5 | 6.8875 | 5.10201 |
| 2 | 5.85 | 16.8827 |
| 2.5 | 4.8125 | 33.9481 |
| 3 | 3.775 | 80.6644 |
| 3.5 | 2.7375 | 89.9209 |
| 4 | 1.7 | 89.9209 |
| Center-to-Center Spacing = .25 mm | | |
| 0 | 10 | 0 |
| .5 | 8.9625 | 0 |
| 1 | 7.925 | 0 |
| 1.5 | 6.8875 | 0 |
| 2 | 5.85 | 1.46929 |
| 2.5 | 4.8125 | 14.2255 |
| 3 | 3.775 | 86.1147 |
| 3.5 | 2.7375 | 89.9209 |
| 4 | 1.7 | 89.9209 |
| Center-to-Center Spacing = .3 mm | | |
| 0 | 10 | 0 |
| .5 | 8.9695 | 0 |
| 1 | 7.925 | 0 |
| 1.5 | 6.8875 | 0 |
| 2 | 5.85 | 0 |
| 2.5 | 4.8125 | 2.28287 |
| 3 | 3.775 | 18.9855 |
| 3.5 | 2.7375 | 55.7393 |
| 4 | 1.7 | 89.9209 |

The following listing is a program for calculating the center frequency of an ultrasonic spectrum at a given depth in tissue and can be used in the selection of appropriate depth for switching between a stepped array mode of operation, a combination of stepped array mode and angle scanning, or sector scanning for transmitting and/or receiving ultrasonic transducer arrays in accordance with the invention. The program runs on a Digital Equipment PDP 11/40 minicomputer.

```
5     ! PEAK
10    ! TISSUE ATTEN EFFECT ON CENTER FREQ
30    INPUT "ATTEN (DB/CM/MHZ)",A
40    ? "": ? ""
50    ? "D","FR","RMAX"
100   FOR D=0 TO 4 STEP .5
103   RM=0
105   FOR FR=.25 TO 15 STEP .25
110   A1=.0493*(FR-9.75)*(FR-9.75)
120   A2=.23*A*FR*D
130   R=EXP(-A1-A2)
140   IF R>RM THEN RM=R:FM=FR
150   NEXT FR
155   ? ""
160   ? D,FM,RM
170   NEXT D
```

The listing below is a program for a Hewlett-Packard HP-85 desk calculator which calculates and plots ultrasonic spectra at various depths in tissue, and is of further assistance in the selection of operating mode for transmitting and/or sensing transducers in accordance with the invention.

```
100    GOSUB 1000 ! INIT
110    GOSUB 2000! INPUT
120    GOSUB 4000! PLOT SET-UP
130    GOSUB 3000! CALCULATE&PLOT
140    GOSUB 5000! COPY
160    GOTO 110
1000   ! INIT
1010   F0=10 ! MHz XDUCER CENTER FREQ
1020   F1=0 ! MIN FREQ
1030   F2=15 ! MAX FREQ
1040   F3=.25 ! ΔF
1050   B1=40 ! %BANDWIDTH
1060   B=B1*.01 ! FRAC BANDWIDTH
1070   K=.6 ! dB/cm/MHz
1080   Z1=6 ! DEPTH INTO TISSUE(cm)
1090   Z2=1 ! ΔZ FOR PLOTTING
1100   CLEAR
1110   DISP "DATE" @ INPUT D9$
1999   RETURN
2000   ! INPUT
2005   CLEAR
2010   DISP "F=";F0;"MHz XDUCER FREQ"
2020   DISP "B=";B1;"%BANDWIDTH"
2030   DISP "K=";K;"dB/cm/MHz"
2040   DISP "ZMAX=";Z1;"cm DEEP"
2050   DISP @ DISP
2060   DISP "TYPE,VALUE";@ INPUT T$,V
2070   IF T$="F" THEN F0=V
2080   IF T$="B" THEN B1=V @ B=.01*B1
2090   IF T$="K" THEN K=V
2100   IF T$="Z" THEN Z1=V
2110   IF T$="0" THEN RETURN
2120   GOTO 2005
2999   RETURN
3000   ! CALCULATE
3005   FOR Z=0 TO Z1 STEP Z2
3007   PENUP
3008   Q=0
3010   FOR F=F1 TO F2 STEP F3
```

-continued

```
3020     A=-K*F*2*Z
3030     T=-12*((F-F0)/(B*F0)) 2
3040     L=A+T
3050     IF L>Y1 THEN PLOT F,L @ Q=1
3055     IF L<Y1 AND Q>0 THEN LABEL
         VAL$(Z) @ PENUP @ Q=2
3060     NEXT F
3065     IF Q#2 THEN IMOVE .25,0 @ L
         ABEL VAL$(Z)
3070     PENUP
3080     NEXT Z
3999     RETURN
4000     ! PLOT SET-UP
4010     CLEAR
4020     GCLEAR
4040     Y1=-80 ! YMIN
4050     Y2=0 ! YMAX
4060     SCALE F1-1,F2+1,Y1-10,Y2+10
4070     XAXIS Y1,1,F1,F2
4080     XAXIS Y2,1,F1,F2
4085     XAXIS -40,1,F1,F2
4090     YAXIS F1,10,Y1,Y2
4100     YAXIS F2,10,Y1,Y2
4110     YAXIS 5,10,Y1,Y2
4115     YAXIS 10,10,Y1,Y2
4120     FOR F=F1 TO F2 STEP 5
4130     MOVE .95*F,Y1-10 @ LABEL VA
         L$(F)
4140     NEXT F
4990     PENUP
4999     RETURN
5000     ! COPY
5005     PRINT "DATE IS ";D9$ @ PRINT
5010     PRINT "XDUCER FREQ=";F0;"MH
         z"
5020     PRINT "BANDWIDTH=";B1;"%"
5030     PRINT K;"dB/cm/MHz"
5040     PRINT "DEPTHS FROM 0 TO";Z1
         ;"cm"
5050     PRINT @ PRINT
5060     GRAPH @ COPY
5070     PRINT @ PRINT @ PRINT @ PRI
         NT @ PRINT
5999     RETURN
```

The following listing is a program for calculating the maximum scan angle for angle scanned arrays or sector scanned arrays, based on decreases in center frequency of transmitted ultrasonic signals reflected from different depths within tissue being examined with the signals. It also runs on the PDP 11/40 minicomputer.

```
100     V=1.5: ! MM/USEC
110     INPUT "CENTER FREQUENCY(MHZ)";F0
120     INPUT "% BANDWIDTH",BP:B=BP/100
125     INPUT "MAX DEPTH, STEP SIZE (CM)";DM,DD
127     INPUT "C-C SPACING RANGE:
        MIN,MAX,STEP (MM)";SL,SM,DS
130     FOR A=.8 TO 1.2 STEP .2
135     ? "LOSS=";A;"DB/CM-MHZ"
140     FOR S=SL TO SM STEP DS
145     ? "C-C SPACING=";S;"MM"
150     K=0.083*A*B*B*F0*F0: ! PART OF LOSS TERM
160     ? "D(CM)","FREQ","MAX ANGLE": ? ""
200     FOR D=0 TO DM STEP DD
210     FC=F0-K*D: ! NEW XDUCER CENTER FREQ
220     IF FCK=0 THEN FC=.0000001
230     K1=(V/(FC*S))-1
240     IF K1>=1 THEN K1=.999999
250     IF K1<0 THEN K1=0
260     TM=ATN(K1/SQR(1-K1*K1)): ! ARC SINE (K1)
270     ? D,FC,TM*180/3.141592
280     NEXT D
290     ? "": ? "": ? ""
300     NEXT S
310     NEXT A
READY
```

It should now be apparent to those skilled in the art that an ultrasonic imaging apparatus capable of achieving the stated objects of the invention has been provided. The hybrid array approach of this invention allows the combination of a large field of view close to the array, obtained by use of the stepped array approach, and a very wide field deep in the image, obtained with a sector scanning or angle scanning approach. In this manner, the decrease in center frequency of a transmitted signal is utilized to permit sector or angle scanning with an array otherwise suited only for a stepped array mode of operation at higher frequencies near to the array. Thus, the different advantages obtainable with these three modes of operation can be obtained from a single apparatus.

It should further be apparent to those skilled in the art that various changes in form and details of the invention as shown and described may be made. It is intended that such modifications can be included within the spirit and scope of the claims appended hereto.

We claim:

1. An ultrasonic imaging apparatus, which comprises: an array of transducer elements for transmitting ultrasonic signals having a first predetermined center frequency into an object to be examined through use of the transmitted signals reflected from within the object, means connected to transmit the ultrasonic signals from said array in a stepped array mode, means connected to transmit the ultrasonic signals from said array in an angle scanning mode, means for transmitting the signals to a desired depth within the object, the detected echoes from a particular depth sensed by the apparatus having a corresponding second center frequency less than the first center frequency as a result of signal attenuation by the object, and means connected to select automatically between said stepped array transmitting means and said angle scanning transmitting means so that at least some of the transducer elements are selectively used to transmit in both the stepped array mode and the angle scanning mode for operating said array elements based on the detected second center frequency.

2. The ultrasonic imaging apparatus of claim 1 additionally comprising means connected to select a number of transducers in said array for transmitting the ultrasonic signals based on the second center frequency.

3. The ultrasonic imaging apparatus of claim 1 in which said array also receives the transmitted signals reflected from within the object.

4. The ultrasonic imaging apparatus of claim 1 in which said angle scanning mode transmitting means is selected for an increasing number of elements in said transducer array as the second center frequency decreases, and said stepped array mode transmitting means is selected for elements centrally located in said array relative to the elements for which said angle scanning mode transmission means is selected.

5. The ultrasonic imaging apparatus of claim 1 in which said stepped array mode transmitting means is selected for all of the elements in said transducer array for a first range of the second center frequency, said angle scanning mode transmitting means is selected for all of the elements in said transfer array for a second range of the second center frequency, and said angle scanning mode transmitting means is operated in a sector scanning mode.

6. The ultrasonic imaging apparatus of claim 5 in which a scanning angle for the ultrasonic signals is increased as the second center frequency decreases within the second range.

7. The ultrasonic imaging apparatus of claim 1 further comprising means for determining the second center frequency, said second center frequency determining means being connected to control said selecting means.

8. The ultrasonic imaging apparatus of claim 1 in which the second center frequency is calculated, based on a depth within the object being examined.

9. An ultrasonic imaging apparatus, which comprises an array of transducer elements for transmitting ultrasonic signals having a first predetermined frequency spectrum into an object to be examined through use of the transmitted signals reflected from within the object, means for selecting a group consisting of at least one transducer element in said array for transmission of the ultrasonic signals, means for applying signals to the selected transducers to define an examining beam with the ultrasonic signals, means connected to automatically select between a stepped array transmission mode and an angle scanning mode of transmitting the examining beam so that at least some of the transducer elements are selectively used to transmit in both the stepped array mode and the angle scanning mode, means for moving both a central axis of the beam and a direction of the beam, and means to step the beam rectilinearly in the array and to scan the beam angularly, selection between the stepped array transmission mode and the angle scanning mode being made automatically on the basis of a second frequency spectrum of the transmitted ultrasonic signals, which second frequency spectrum is different than the first frequency spectrum, and which second frequency spectrum is detected by the apparatus.

10. The ultrasonic imaging apparatus of claim 9 in which said group selecting means selects an increasing number of transducers constituting the group as a parameter of the second frequency spectrum decreases.

11. The ultrasonic imaging apparatus of claim 9 in which said array also receives the transmitted signals reflected from within the object.

12. The ultrasonic imaging apparatus of claim 9 in which the angle scanning mode is selected for an increasing number of elements in said transducer array as the parameter of the second frequency spectrum decreases, and the stepped array mode is selected for elements centrally located in said array relative to the elements for which said angle scanning mode is selected.

13. The ultrasonic imaging apparatus of claim 9 in which the stepped array mode is selected for all of the elements in said transducer array for a first range of the parameter of the second frequency spectrum and the angle scanning mode is selected as a sector scanning mode for all of the elements in said transducer array for a second range of the parameter of the second frequency spectrum.

14. The ultrasonic imaging apparatus of claim 13 in which a scanning angle for the ultrasonic signals is increased as the parameter of the second frequency spectrum decreases.

15. The ultrasonic imaging apparatus of claim 9 further comprising means for determining at least one parameter of the second frequency spectrum, said second frequency spectrum determining means being connected to control the mode selection.

16. The ultrasonic imaging apparatus of claim 9 in which the at least one parameter of the second frequency spectrum is calculated, based on a depth within the object being examined.

17. An ultrasonic imaging apparatus, which comprises: an array of transducer elements for receiving ultrasonic signals reflected from an object to be examined through use of the reflected ultrasonic signals, means connected to receive the reflected ultrasonic signals from the object in a stepped array mode, means connected to receive the reflected ultrasonic signals from the object in an angle scanning mode, means for transmitting ultrasonic signals having a first predetermined center frequency to a desired depth within the object, the detected reflected signals sensed by the apparatus having a second center frequency less than the first center frequency as a result of signal attenuation by the object, and means connected to select automatically between said stepped array signal receiving means and said angle scanning signal receiving means so that at least some of the transducer elements are selectively used to receive in both the stepped array mode and the angle scanning mode for operating said array elements based on the detected second center frequency.

18. The ultrasonic imaging apparatus of claim 17 additionally comprising means connected to select a number of transducers in said array for receiving the reflected ultrasonic signals based on the second center frequency.

19. The ultrasonic imaging apparatus of claim 17 in which said array also transmits the ultrasonic signals reflected from within the object.

20. The ultrasonic imaging apparatus of claim 17 in which said angle scanning mode receiving means is selected for an increasing number of elements in said transducer array as the second center frequency decreases, and said stepped array mode receiving means is selected for elements centrally located in said array relative to the elements for which said angle scanning mode receiving means is selected.

21. The ultrasonic imaging apparatus of claim 17 in which said stepped array mode receiving means is selected for all of the elements in said transducer array for a first range of the second center frequency, said angle scanning mode receiving means is selected for all of the elements in said transducer array for a second range of the second center frequency, and said angle scanning mode receiving means is operated in a sector scanning mode.

22. The ultrasonic imaging apparatus of claim 21 in which a scanning angle for the ultrasonic signals is increased as the second center frequency decreases within the second range.

23. The ultrasonic imaging apparatus of claim 21 further comprising means for determining the second center frequency, said second center frequency determining means being connected to control said selecting means.

24. The ultrasonic imaging apparatus of claim 21 in which said second center frequency is calculated, based on a depth within the object being examined.

25. An ultrasonic imaging apparatus, which comprises an array of transducer elements for receiving reflected ultrasonic signals transmitted with a first predetermined frequency spectrum into an object to be examined through us of the transmitted signals reflected from within the object, means for selecting a group consisting of at least one transducer element in said array for receiving the reflected ultrasonic signals, means connected to select automatically between a stepped array receiving mode and an angle scanning receiving mode so that at least some of the transducer elements are selectively used to receive in both the stepped array mode and the angle scanning mode, means for moving both a central axis for the received signals and a direction for the received signals, and means to step the received signals angularly, selection between the stepped array receiving mode and the angle scanning receiving mode being made automatically on the basis of a second frequency spectrum of the received ultrasonic signals, which second frequency spectrum is different than the first frequency spectrum, and which second frequency spectrum is detected by the apparatus.

26. The ultrasonic imaging apparatus of claim 25 in which said group selecting means selects an increasing number of transducers constituting the group as a parameter of the second frequency spectrum decreases.

27. The ultrasonic imaging apparatus of claim 25 in which said array also transmits the signals reflected from within the object.

28. The ultrasonic imaging apparatus of claim 25 in which the angle scanning mode is selected for an increasing number of elements in said transducer array as the parameter of the second frequency spectrum decreases, and the stepped array mode is selected for elements centrally located in said array relative to the elements for which said sector scanning mode is selected.

29. The ultrasonic imaging apparatus of claim 25 in which the stepped array mode is selected for all of the elements in said transducer array for a first range of the parameter of the second frequency spectrum and the angle scanning mode is selected as a sector scanning mode for all of the elements in said transducer array for a second range of the parameter of the second frequency spectrum.

30. The ultrasonic imaging apparatus of claim 29 in which a scanning angle for the ultrasonic signals is increased as the parameter of the second frequency spectrum decreases.

31. The ultrasonic imaging apparatus of claim 25 further comprising means for determining at least one parameter of the second frequency spectrum, said second frequency spectrum determining means being connected to control the mode selection.

32. The ultrasonic imaging apparatus of claim 25 in which the at least one parameter of the second frequency spectrum is calculated, based on a depth within the object being examined.

33. An ultrasonic imaging apparatus, which comprises: an array of transducer elements for transmitting ultrasonic signals having a first predetermined center frequency into an object to be examined through use of the transmitted signals reflected from within the object and for receiving the reflected signals, means connected to transmit and receive the ultrasonic signals from said array in a stepped array mode, means connected to transmit and receive the ultrasonic signals from said array in an angle scanning mode, means for transmitting the signals to a desired depth within the object, the detected echoes from a particular depth sensed by said transducer array having a corresponding second center frequency less than the first center frequency as a result of signal attenuation by the object, and means connected to select automatically between said stepped array transmitting and receiving means and said angle scanning transmitting and receiving means so that at least some of the transducer elements are selectively used to transmit and receive in both the stepped array mode and the angle scanning mode for operating said array elements based on the detected second center frequency.

34. The ultrasonic imaging apparatus of claim 33 additionally comprising means connected to select a number of transducers in said array for transmitting and receiving the ultrasonic signals based on the second center frequency.

35. The ultrasonic imaging apparatus of claim 33 in which said angle scanning mode transmitting and receiving means is selected for an increasing number of elements in said transducer array as the second center frequency decreases, and said stepped array mode transmitting and receiving means is selected for elements centrally located in said array relative to the elements for which said angle scanning mode transmitting and receiving means is selected.

36. The ultrasonic imaging apparatus of claim 33 in which said stepped array mode transmitting and receiving means is selected for all of the elements in said transducer array for a first range of the second center frequency, said angle scanning mode transmitting and receiving means is selected for all of the elements in said transducer array for a second range of the second center frequency, and said angle scanning mode transmitting means is operated in a sector scanning mode.

37. The ultrasonic imaging apparatus of claim 36 in which a scanning angle for the ultrasonic signals is increased as the second center frequency decreases within the second range.

38. The ultrasonic imaging apparatus of claim 33 further comprising means for determining the second center frequency, said second center frequency determining means being connected to control said selecting means.

39. The ultrasonic imaging apparatus of claim 33 in which the second center frequency is calculated, based on a depth within the object being examined.

40. An ultrasonic imaging apparatus, which comprises an array of transducer elements for transmitting ultrasonic signals having a first predetermined frequency spectrum into an object to be examined through use of the transmitted signals reflected from within the object, and for receiving the reflected signals, means for selecting a group consisting of at least one transducer element in said array for transmitting and receiving the ultrasonic signals, means for applying signals to the selected transducers to define an examining beam with the ultrasonic signals, means connected to select automatically between a stepped array transmitting and receiving mode and an angle scanning transmitting and receiving mode for examining the examining beam so that at least some of the transducer elements are selectively used to transmit and receive in both the stepped array mode and the angle scanning mode, means for moving both a central axis of the beam and a direction of the beam, and means to step the beam rectilinearly in the array and to scan the beam angularly, selection between the stepped array transmitting and receiving mode and the angle scanning transmitting and receiving mode being made automatically on the basis of a second frequency spectrum of the received ultrasonic signals, which second frequency spectrum is different than the first frequency spectrum, and which second frequency spectrum is detected by the apparatus.

41. The ultrasonic imaging apparatus of claim 40 in which said group selecting means selects an increasing number of transducers constituting the group as a parameter of the second frequency spectrum decreases.

42. The ultrasonic imaging apparaus of claim 40 in which the angle scanning mode is selected for an increasing number of elements in said transducer array as the parameter of the second frequency spectrum decreases, and the stepped array mode is selected for elements centrally located in said array relative to the elements for which said sector scanning mode is selected.

43. The ultrasonic imaging apparatus of claim 40 in which the stepped array mode is selected for all of the elements in said transducer array for a first range of the parameter of the second frequency spectrum and the angle scanning mode is selected as a sector scanning mode for all of the elements in said transducer array for a second range of the parameter of the second frequency spectrum.

44. The ultrasonic imaging apparatus of claim 43 in which a scanning angle for the ultrasonic signals is increased as the parameter of the second frequency spectrum decreases.

45. The ultrasonic imaging apparatus of claim 40 further comprising means for determining at least one parameter of the second frequency spectrum, said second frequency spectrum determining means being connected to control the mode selection.

46. The ultrasonic imaging apparatus of claim 40 in which the at least one parameter of the second frequency spectrum is calculated, based on a depth within the object being examined.

* * * * *